US008326127B2

(12) United States Patent
Casagrande

(10) Patent No.: US 8,326,127 B2
(45) Date of Patent: Dec. 4, 2012

(54) METHODS AND APPARATUS FOR IDENTIFYING PORTIONS OF A VIDEO STREAM BASED ON CHARACTERISTICS OF THE VIDEO STREAM

(75) Inventor: Steven M. Casagrande, Castle Rock, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 724 days.

(21) Appl. No.: 12/362,806

(22) Filed: Jan. 30, 2009

(65) Prior Publication Data

US 2010/0195972 A1   Aug. 5, 2010

(51) Int. Cl.
*H04N 5/91* (2006.01)
*G11B 27/02* (2006.01)

(52) U.S. Cl. ........................................ 386/278
(58) Field of Classification Search .................. None
See application file for complete search history.

(56) References Cited

U.S. PATENT DOCUMENTS

| | | |
|---|---|---|
| 3,919,479 A | 11/1975 | Moon |
| 4,450,531 A | 5/1984 | Kenyon |
| 4,520,404 A | 5/1985 | Von Kohorn |
| 4,605,964 A | 8/1986 | Chard |
| 4,697,209 A | 9/1987 | Kiewit |
| 4,739,398 A | 4/1988 | Thomas |
| 4,750,213 A | 6/1988 | Novak |
| 4,888,769 A | 12/1989 | Deal |
| 4,918,730 A | 4/1990 | Schulze |
| 4,930,160 A | 5/1990 | Vogel |
| 5,333,091 A | 7/1994 | Iggulden |
| 5,434,678 A | 7/1995 | Abecassis |
| 5,610,653 A | 3/1997 | Abecassis |
| 5,614,940 A | 3/1997 | Cobbley |
| 5,684,918 A | 11/1997 | Abecassis |
| 5,692,093 A | 11/1997 | Iggulden |
| 5,696,866 A | 12/1997 | Iggulden |
| 5,696,869 A | 12/1997 | Abecassis |

(Continued)

FOREIGN PATENT DOCUMENTS

JP   2006332765 A   12/2006

OTHER PUBLICATIONS

European Patent Office "Extended European Search Report" mailed Oct. 4, 2011; European Patent Appln. No. 10152184.7.

(Continued)

*Primary Examiner* — Thai Tran
*Assistant Examiner* — Sunghyoun Park
(74) *Attorney, Agent, or Firm* — Ingrassia Fisher & Lorenz, P.C.

(57) ABSTRACT

The various embodiments described herein generally provide for the identification of locations in a presentation stream based on metadata associated with the presentation stream. Locations within an audio/video stream are identified by processing associated text data using autonomous location information referencing the text data. The identified locations within a presentation stream may be utilized to identify boundaries of segments within the presentation stream, such as segments of a show and interstitials of the show. Processing is then performed to determine whether the identified boundaries possess specific characteristics. If the identified boundaries do not possess the identified characteristics, then additional processing is performed to identify other locations, temporally near the identified boundaries, which correspond with boundaries of the portion of the audio/video stream identified by the autonomous location information.

23 Claims, 9 Drawing Sheets

U.S. PATENT DOCUMENTS

| | | | |
|---|---|---|---|
| 5,703,655 | A | 12/1997 | Corey |
| 5,742,730 | A | 4/1998 | Couts |
| 5,892,536 | A | 4/1999 | Logan |
| 5,953,485 | A | 9/1999 | Abecassis |
| 5,987,210 | A | 11/1999 | Iggulden |
| 5,999,688 | A | 12/1999 | Iggulden |
| 6,005,603 | A | 12/1999 | Flavin |
| 6,088,455 | A | 7/2000 | Logan |
| 6,091,886 | A | 7/2000 | Abecassis |
| 6,151,444 | A | 11/2000 | Abecassis |
| 6,208,805 | B1 | 3/2001 | Abecassis |
| 6,408,128 | B1 | 6/2002 | Abecassis |
| 6,553,178 | B2 | 4/2003 | Abecassis |
| 6,574,594 | B2 | 6/2003 | Pitman |
| 6,698,020 | B1 | 2/2004 | Zigmond |
| 6,718,551 | B1 | 4/2004 | Swix |
| 6,931,451 | B1 | 8/2005 | Logan |
| 6,961,954 | B1 | 11/2005 | Maybury et al. |
| 6,978,470 | B2 | 12/2005 | Swix |
| 6,993,245 | B1 | 1/2006 | Harville |
| 7,055,166 | B1 | 5/2006 | Logan |
| 7,058,376 | B2 | 6/2006 | Logan |
| 7,110,658 | B1 | 9/2006 | Iggulden |
| 7,243,362 | B2 | 7/2007 | Swix |
| 7,251,413 | B2 | 7/2007 | Dow |
| 7,302,160 | B1 * | 11/2007 | Wells .............................. 386/250 |
| 7,430,360 | B2 | 9/2008 | Abecassis |
| 7,565,016 | B2 * | 7/2009 | Hua et al. ...................... 382/229 |
| 7,873,982 | B2 | 1/2011 | Smith et al. |
| 2002/0009974 | A1 * | 1/2002 | Kuwahara et al. ........... 455/67.6 |
| 2002/0090198 | A1 | 7/2002 | Rosenberg |
| 2002/0097235 | A1 | 7/2002 | Rosenberg |
| 2002/0120925 | A1 | 8/2002 | Logan |
| 2003/0066078 | A1 | 4/2003 | Bjorgan |
| 2003/0093790 | A1 | 5/2003 | Logan |
| 2003/0123841 | A1 * | 7/2003 | Jeannin ........................... 386/46 |
| 2003/0123850 | A1 * | 7/2003 | Jun et al. ......................... 386/68 |
| 2003/0202773 | A1 | 10/2003 | Dow |
| 2004/0010807 | A1 | 1/2004 | Urdang |
| 2004/0040042 | A1 | 2/2004 | Feinleib |
| 2004/0083484 | A1 | 4/2004 | Ryal |
| 2004/0125877 | A1 | 7/2004 | Chang et al. |
| 2004/0177317 | A1 | 9/2004 | Bradstreet |
| 2004/0190853 | A1 | 9/2004 | Dow |
| 2004/0255330 | A1 | 12/2004 | Logan |
| 2004/0255334 | A1 | 12/2004 | Logan |
| 2004/0255336 | A1 | 12/2004 | Logan |
| 2005/0005308 | A1 | 1/2005 | Logan |
| 2005/0044561 | A1 | 2/2005 | McDonald |
| 2005/0076359 | A1 | 4/2005 | Pierson |
| 2005/0081252 | A1 | 4/2005 | Chefalas |
| 2005/0262539 | A1 | 11/2005 | Barton |
| 2006/0015925 | A1 | 1/2006 | Logan |
| 2006/0218617 | A1 | 9/2006 | Bradstreet |
| 2006/0280437 | A1 | 12/2006 | Logan |
| 2007/0106646 | A1 * | 5/2007 | Stern et al. ........................ 707/3 |
| 2007/0113250 | A1 | 5/2007 | Logan |
| 2007/0168543 | A1 | 7/2007 | Krikorian |
| 2007/0250901 | A1 * | 10/2007 | McIntire et al. ............... 725/146 |
| 2007/0300249 | A1 * | 12/2007 | Smith et al. ...................... 725/19 |
| 2007/0300250 | A1 | 12/2007 | Smith et al. |
| 2007/0300258 | A1 | 12/2007 | O'Connor |
| 2008/0028426 | A1 * | 1/2008 | Goto et al. ........................ 725/39 |
| 2008/0036917 | A1 | 2/2008 | Pascarella |
| 2008/0127244 | A1 * | 5/2008 | Zhang .............................. 725/32 |
| 2008/0155627 | A1 | 6/2008 | O'Connor |
| 2009/0295993 | A1 * | 12/2009 | Chhokra ........................ 348/553 |
| 2011/0110646 | A1 | 5/2011 | Smith et al. |

OTHER PUBLICATIONS

Casagrande, Steven; U.S. Appl. No. 11/942,111, filed Nov. 19, 2007.
Hodge, Kenneth; U.S. Appl. No. 11/942,896, filed Nov. 20, 2007.
Casagrande, Steven; U.S. Appl. No. 11/942,901, filed Nov. 20, 2007.
Gratton, Max; U.S. Appl. No. 12/052,623, filed Mar. 20, 2008.
Casagrande, Steven; U.S. Appl. No. 12/130,792, filed May 30, 2008.
Casagrande, Steven; U.S. Appl. No. 12/135,360, filed Jun. 9, 2008.
"Comskip", http://www.kaashoek.com/comskip/, commercial detector, (Jan. 26, 2007).
Dimitrova, N., et al, "Real Time Commercial Detection Using MPEG Features", Philips Research, (July 2002).
Haughey, Matt, "EFF's ReplayTV Suit Ends", http://www.pvrblog.com/pvr/2004/01/effs_replaytv_s.html, (Jan. 12, 2004).
"How to Write a New Method of Commercial Detection", MythTV, http://www.mythtv.org/wiki/index.php/How to Write a New Method of Commercial Detection, (Jan. 26, 2007).
Manjoo, Farhad, "They Know What You're Watching", Wired News, http://www.wired.com/news/politics/0.1283.52302.00.html, (May 2, 2002).
Mizutani, Masami, et al, "Commercial Detection in Heterogeneous Video Streams Using Fused Multi-Modal and Temporal Features", IEEE ICASSP, 2005, Philadelphia, (Mar. 22, 2005).
"Paramount Pictures Corp. v. ReplayTV & SonicBlue", http://www.eff.org/IP/Video/Paramount v. ReplayTV/20011031_complaint.html, Complaint Filed, (Oct. 30, 2001).
RCA, "RCA DRC8060N DVD Recorder", http://www.pricegrabber.com/rating_getprodrev.php/product_id=12462074/id, PriceGrabber.com, (Jan. 26, 2007).
Tew, Chris, "How MythTV Detects Commercials", http://www.pvrwire.com/2006/10/27/how-mythtv-detects-commercials/, (Oct. 27, 2006).

* cited by examiner

METHODS AND APPARATUS FOR IDENTIFYING PORTIONS OF A VIDEO STREAM BASED ON CHARACTERISTICS OF THE VIDEO STREAM

BACKGROUND

Digital video recorders (DVRs) and personal video recorders (PVRS) allow viewers to record video in a digital format to a disk drive or other type of storage medium for later playback. DVRs are often incorporated into set-top boxes for satellite and cable television services. A television program stored on a set-top box allows a viewer to perform time shifting functions, and may additionally allow a viewer to skip over commercial breaks and other portions of the recording that the viewer does not desire to watch. However, the user performs this function manually, for example, using a fast forward button of a remote control associated with the DVR. This manual fast forwarding is an inconvenience for the user. Further, manual fast forwarding by a user often leads to inaccurate results, because the user may fast forward past portions of the recording they desire to watch, or may resume playback during the portion of the recording that they want to skip over.

BRIEF DESCRIPTION OF THE DRAWINGS

The same number represents the same element or same type of element in all drawings.

DETAILED DESCRIPTION OF THE DRAWINGS

Figure 1:
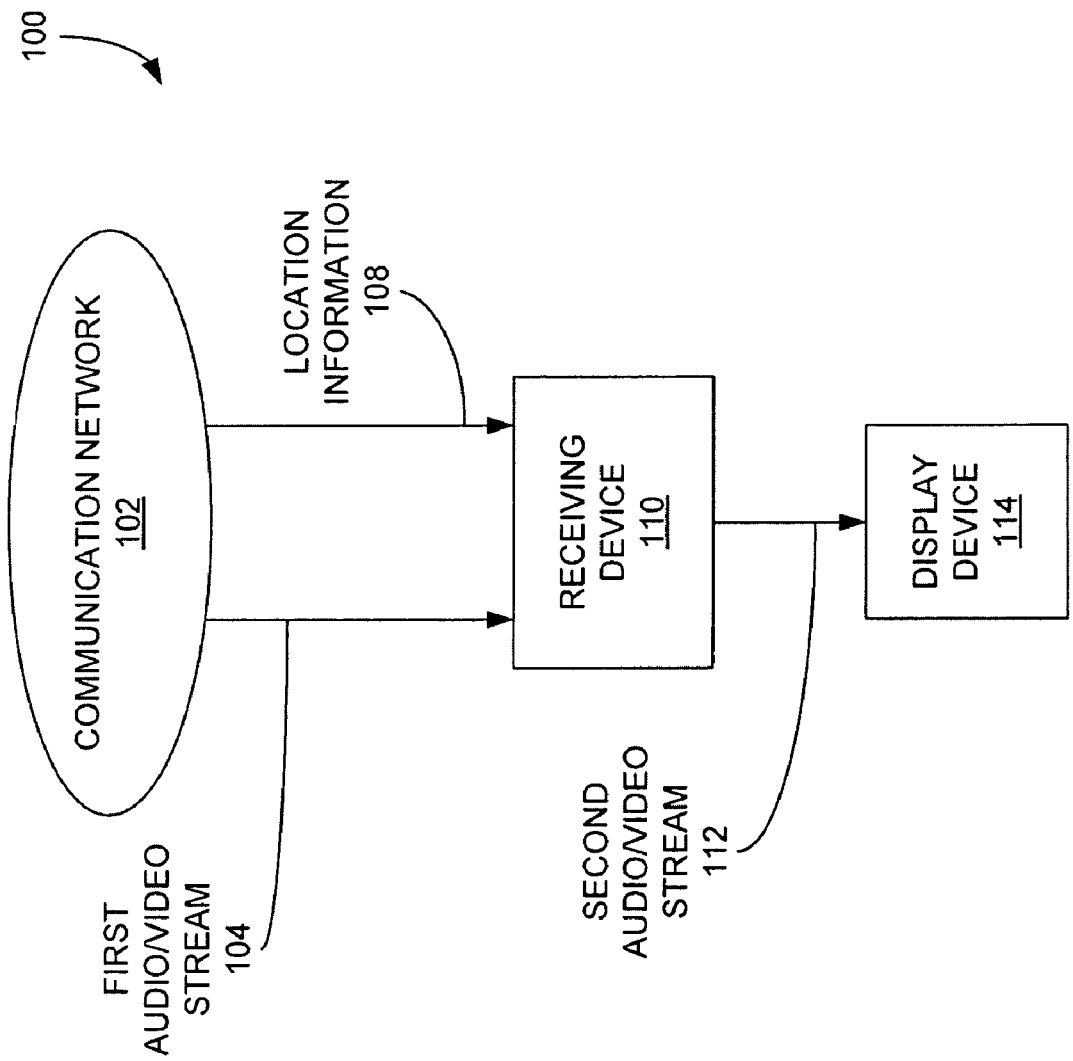
FIG. 1 illustrates an embodiment of a system for presenting content to a user.

The various embodiments described herein generally provide apparatus, systems and methods which facilitate the reception, processing, and outputting of presentation content. More particularly, the various embodiments described herein provide for the identification of locations in a presentation stream based on metadata associated with the presentation stream. Identified locations within a presentation stream may be utilized to identify boundaries of segments within the presentation stream, such as segments of a show and interstitials (e.g., commercials) of the show. In various embodiments, identified portions of a presentation stream may be utilized for skipping segments of content during presentation, insertion of supplemental or substitute content within various locations of the presentation stream, selective presentation of specific segments of the presentation stream, presentation of segments of content in non-sequential order and the like.

In at least one embodiment, the audio/video stream to be received, processed, outputted and/or communicated may come in any form of an audio/video stream. Exemplary audio/video stream formats include motion picture experts group (MPEG) standards, Flash, Windows Media and the like. It is to be appreciated that the audio/video stream may be supplied by any source, such as an over-the-air broadcast, a satellite or cable television distribution system, a digital video disk (DVD) or other optical disk, the internet or other communication network and the like. In at least one embodiment, the audio/video data may be associated with supplemental data that includes text data, such as closed captioning data or subtitles. Particular portions of the closed captioning data may be associated with specified portions of the audio/video data.

Generally, an audio/video stream is a contiguous block of associated audio and video data that may be transmitted to, and received by, an electronic device, such as a terrestrial ("over-the-air") television receiver, a cable television receiver, a satellite television receiver, an internet connected television or television receiver, a computer, a portable electronic device or the like. In at least one embodiment, an audio/video stream may include a recording of a contiguous block of programming from a television channel (e.g., an episode of a television show). For example, a DVR may record a single channel between 7:00 and 8:00, which may correspond with a single episode of a television program. Generally, an hour long recording includes approximately 42 minutes of video frames of the television program and approximately 18 minutes of video frames of commercials and other content that is not part of the television program.

The television program may be comprised of multiple segments of video frames, which are interspersed with interstitials (e.g., commercials). As used herein, an interstitial refers to the video frames of a recording that do not belong to a selected show (e.g., commercials, promotions, alerts and other shows). A segment of video includes contiguous video frames of the program that are between one or more interstitials.

Further, an audio/video stream may be delivered by any transmission method, such as broadcast, multicast, simulcast, closed circuit, point-to-point (by "streaming," file transfer, or other means) or other methods. Additionally, the audio/video stream may be transmitted by way of any communication technology, such as by satellite, wire or optical cable, wireless or other means. The audio/video stream may also be transferred over any type of communication network, such as the internet or other wide area network (WAN), a local area network (LAN), a private network, a mobile communication system, a terrestrial television network, a cable television network, a satellite television network or internet protocol television (IPTV) and the like.

In various embodiments described herein, the text data associated with an audio/video stream is processed to identify portions of the audio/video stream. More particularly, a receiving device receives autonomous location information referencing a location within the first presentation stream. The text data may be processed based on the autonomous location information to identify boundaries of portions of the audio/video stream. The portions of the audio/video stream between identified boundaries may then be designated for presentation to a user or may be designated for skipping during presentation of the audio/video stream. Thus, in at least one embodiment, portions of an audio/video stream that a user desires to view may be presented to the user, and portions of the audio/video stream that a user desires not to view may be skipped during presentation of the audio/video stream. Further, substitute content may be identified for presentation in association with portions of the original audio/video stream. The substitute content may be inserted within any identified location of the audio/video stream. For example, the original commercials included in a recorded audio/video stream may be replaced with updated commercials during subsequent presentation of the recorded audio/video stream.

The autonomous location information may be supplied separately from the presentation stream. Further, the autonomous location information and/or the signature data may be supplied by the same source as the presentation stream or a different source as the presentation stream depending on desired design criteria. For example, a television provider may broadcast the autonomous location information to a DVR subsequent to the broadcast of the television program.

In some embodiments, the boundaries of segments of the presentation stream may correspond with the identified location referenced by the location information. In other words, the identified location corresponds with the boundary of the segment. In at least one embodiment, the boundaries of segments are specified relative to the identified location referenced by the location information. For example, an identified location may be the middle of a segment of the presentation stream and the boundaries of the segment may be specified by beginning and ending off-sets specified relative to the identified location.

In at least one embodiment, identified segments may be designated for playback or skipping during presentation. For example, one or more boundaries of a portion of the presentation stream may correlate with an interstitial, e.g., commercials of a television program. The receiving device may utilize the identified boundaries of the portion of the presentation stream to skip presentation of the interstitial during playback. Other portions of presentation content may also be skipped, such as chapters or segments of a movie, television program and the like.

In at least one embodiment, interstitials and other segments of a presentation stream identified in accordance with the above may be replaced with substitute content. For example, an interstitial (e.g., a commercial) may be replaced with a more timely or relevant commercial. Similarly, a chapter or scene in a movie or television program may be replaced with an alternative chapter or scene.

In some embodiments, additional portions of content may be inserted into a presentation stream at identified locations. The insertion of content may be performed in conjunction with or independently of the filtering of other portions of the presentation stream. For example, several commercial breaks may be filtered from a presentation stream and a substitute commercial break may be inserted at another location independent of the previous commercial breaks. In one scenario, new content, such as a new scene, may be inserted into an otherwise unmodified presentation stream.

In at least one embodiment, identified segments of a presentation stream may be presented in a non-sequential order. In other words, a presentation stream may include a plurality of segments which were originally intended for presentation in a specific order. However, identified segments may be presented in a different temporal order than the original temporal order of the segments. For example, the segments of the presentation stream may be presented in reverse chronological order. Similarly, the segments may be presented in a custom order. For example, a recorded audio/video stream of a news broadcast may include "top stories", "national news", "local news", "weather" and "sports" portions presented in that particular order. However, the user may desire to playback the recorded news broadcast in the following order: "sports", "weather", "top stories", "local news" and "national news". In at least one embodiment, a receiving device analyzes the presentation stream to determine the boundaries of each segment of the news broadcast. The user designates the playback order and the receiving device presents the various segments of the presentation stream automatically in the designated order.

In at least one embodiment, a user may be presented with a menu of available segments of the television program and may select one or more of the available segments for presentation. The receiving device may identify segments and generate a selection menu therefrom. Based upon user selection of particular segments from the selection menu, the receiving device responsively outputs the selected segments, skipping presentation of the undesignated segments. For example, a user may select particular news stories that they desire to view, and the recording device may output the selected news stories back-to-back, skipping presentation of undesignated segments interspersed therebetween.

As described above, a user may effectively view a subset of the segments of an audio/video stream in the original temporal order of the segments, skipping output of undesignated segments of the audio/video stream. In some embodiments, a user may designate a different presentation order for the segments of the audio/video stream than the original presentation order of the segments. This allows the user to reorder the content of an audio/video stream.

In some embodiments, a user may be restricted from temporally moving through particular identified segments of a presentation stream at a non-real time presentation rate of the audio/video stream. In other words, a receiving device may automatically output particular segments of a presentation stream without skipping over or otherwise fast forwarding through the segments, regardless of whether a user provides input requesting fast forwarding or skipping through the segments. For example, commercials within a television program may be associated with restrictions against fast forwarding or skipping and a recording device may automatically present the commercial segments regardless of the receipt of user input requesting non-presentation of the segments.

In some scenarios, the text data associated with a particular location may be shifted from its original presentation location. For example, the closed captioning data associated with a show may be delayed by several seconds relative to the corresponding audio data of the audio/video stream. In this scenario, an identified location may not correlate with the boundary of the segment, but rather, may correlate with a location that is shifted from the boundary by the presentation delay of the closed captioning data. Thus, in some embodiments, the characteristics of an identified location may be processed to determine whether the identified location corresponds with a boundary of a segment. For example, the processing may comprise determining whether the identified location includes a substantially black screen or corresponds with muted audio, which are two characteristics that typically correlate with segment transitions.

If the processing operations result in a determination that the identified location does not correspond with a boundary, then additional processing operations may be performed to select other locations temporally near the identified location. The other locations may be selected temporally forward or temporally backwards from the identified location or a combination thereof depending on desired design criteria. The selected locations may be processed to determine whether the selected locations correspond with a boundary of a segment. If the processing results in a determination that the selected location corresponds with a boundary, then the selected location may be used as the starting and/or ending boundary of the segment.

The techniques described herein will be described in the context of filtering interstitials from a recorded television program. However, it is to be appreciated that the teachings described herein may also be applied to filtering other types of content from any type of presentation stream. Further, it is to be appreciated that the boundary location techniques described herein may also be applied to locating content for other reasons, such as replacing content, selectively playing portions of content and the like.

FIG. 1 illustrates an embodiment of a system 100 for presenting content to a user. The system of FIG. 1 is operable for filtering audio/video content from a contiguous block of audio/video data for presentation to a user. The system 100 includes a communication network 102, a receiving device 110 and a display device 114. Each of these components is discussed in greater detail below.

The communication network 102 may be any communication network capable of transmitting an audio/video stream. Exemplary communication networks include television distribution networks (e.g., over-the-air, satellite and cable television networks), wireless communication networks, public switched telephone networks (PSTN), and local area networks (LAN) or wide area networks (WAN) providing data communication services. The communication network 102 may utilize any desired combination of wired (e.g., cable and fiber) and/or wireless (e.g., cellular, satellite, microwave and other radio frequency technologies) communication mediums and any desired network topology (or topologies when multiple mediums are utilized).

The receiving device 110 of FIG. 1 may be any device capable of receiving an audio/video stream from the communication network 102. For example, in the case of the communication network 102 being a cable or satellite television network, the receiving device 110 may be a set-top box configured to communicate with the communication network 102. The receiving device 110 may be a DVR in some embodiments. In another example, the receiving device 110 may be computer, a personal digital assistant (PDA) or similar device configured to communicate with the internet or comparable communication network 102. While the receiving device 110 is illustrated as receiving content via the communication network 102, in other embodiments, the receiving device may receive, capture and record video streams from non-broadcast services, such as video recorders, DVD players, personal computers or the internet.

The display device 114 may be any device configured to receive an audio/video stream from the receiving device 110 and present the audio/video stream to a user. Examples of the display device 114 include a television, a video monitor or similar device capable of presenting audio and video information to a user. The receiving device 110 may be communicatively coupled to the display device 114 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the display device 114 may be integrated within the receiving device 110. For example, each of a computer, a PDA and a mobile communication device may serve as both the receiving device 110 and the display device 114 by providing the capability of receiving audio/video streams from the communication network 102 and presenting the received audio/video streams to a user. In another implementation, a cable-ready television may include a converter device for receiving audio/video streams from the communication network 102 and displaying the audio/video streams to a user.

In the system 100, the communication network 102 transmits each of a first audio/video stream 104 and location information 108 to the receiving device 110. The first audio/video stream 104 includes audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the MPEG encoding standards, such as MPEG-2 or MPEG-4, as may be used in direct broadcast systems (DBS), terrestrial advanced television systems committee (ATSC) systems or cable systems. However, different audio and video data formats may be utilized in other implementations.

Also associated with the first audio/video stream 104 is supplemental data providing information relevant to the audio data and/or the video data of the first audio/video stream 104. In one implementation, the supplemental data includes text data, such as closed captioning data, available for visual presentation to a user during the presentation of the associated audio and video data of the audio/video data stream 104. In some embodiments, the text data may be embedded within the audio/video stream 104 during transmission across the communication network 102 to the receiving device 110. In one example, the text data may conform to any text data or closed captioning standard, such as the electronic industries alliance 608 (EIA-608) standard employed in ATSC transmissions or the EIA-608 standard. When the text data is available to the display device 114, the user may configure the display device 114 to present the text data to the user in conjunction with the video data.

Each of a number of portions of the text data may be associated with a corresponding portion of the audio data or video data also included in the audio/video stream 104. For example, one or more frames of the video data of the audio/video stream 104 may be specifically identified with a segment of the text data included in the first audio/video stream 104. A segment of text data (e.g., a string of bytes) may include displayable text strings as well as non-displayable data strings (e.g., codes utilized for positioning the text data). As a result, multiple temporal locations within the audio/video stream 104 may be identified by way of an associated portion of the text data. For example, a particular text string or phrase within the text data may be associated with one or more specific frames of the video data within the first audio/video stream 104 so that the text string is presented to the user simultaneously with its associated video data frames. Therefore, the particular text string or phrase may provide an indication of a location of these video frames, as well as the portion of the audio data synchronized or associated with the frames.

The communication network 102 also transmits location information 108 to the receiving device 110. The location information 108 may be transmitted to the receiving device 110 together or separately from the first audio/video stream 104. The location information 108 specifies locations within the first audio/video stream 104 that are to be skipped and/or presented during presentation of the audio/video data of the first audio/video stream 104 by the receiving device 110. For example, if the first audio/video stream 104 includes one or more segments of a television show interspersed with one or more interstitials, then the location information 108 may identify the locations of the segments, which are to be presented, and/or identify the locations of the interstitial, which are to be skipped.

The location information 108 may identify the boundaries of either the segments or the interstitials. More particularly, the location information 108 may reference the text data to identify a video location within the first audio/video stream 104. The video location may then be utilized to determine the boundaries of either the segments or the interstitials. Generally, the beginning boundary of a segment corresponds with the ending boundary of an interstitial. Similarly, the ending boundary of a segment corresponds with the beginning boundary of an interstitial. Thus, the receiving device 110 may utilize the boundaries of segments to identify the boundaries of the interstitials and vice versa. In some embodiments, the first audio/video stream 104 may not include both segments and interstitials, but nonetheless may include portions of audio/video data that a user desires to skip during presentation of the audio/video content of the first audio/video stream 104. Thus, the location information 108 may identify which portions of the audio/video content of the first audio/video stream 104 are to be presented and/or skipped during presentation to a user.

The receiving device 110 is operable for processing the text data to identify the portions of the audio/video stream 104 which are to be presented to a user. More particularly, the receiving device 110 operates to identify the segments of the audio/video stream 104 which are to be presented to a user. The receiving device 110 outputs a second audio/video stream 112, including the segments of the first audio/video stream 104 for presentation by the display device 114. Thus, in some embodiments, the receiving device 110 operates to filter the interstitials from the first audio/video stream 104 when outputting the second audio/video stream 112.

Figure 2:
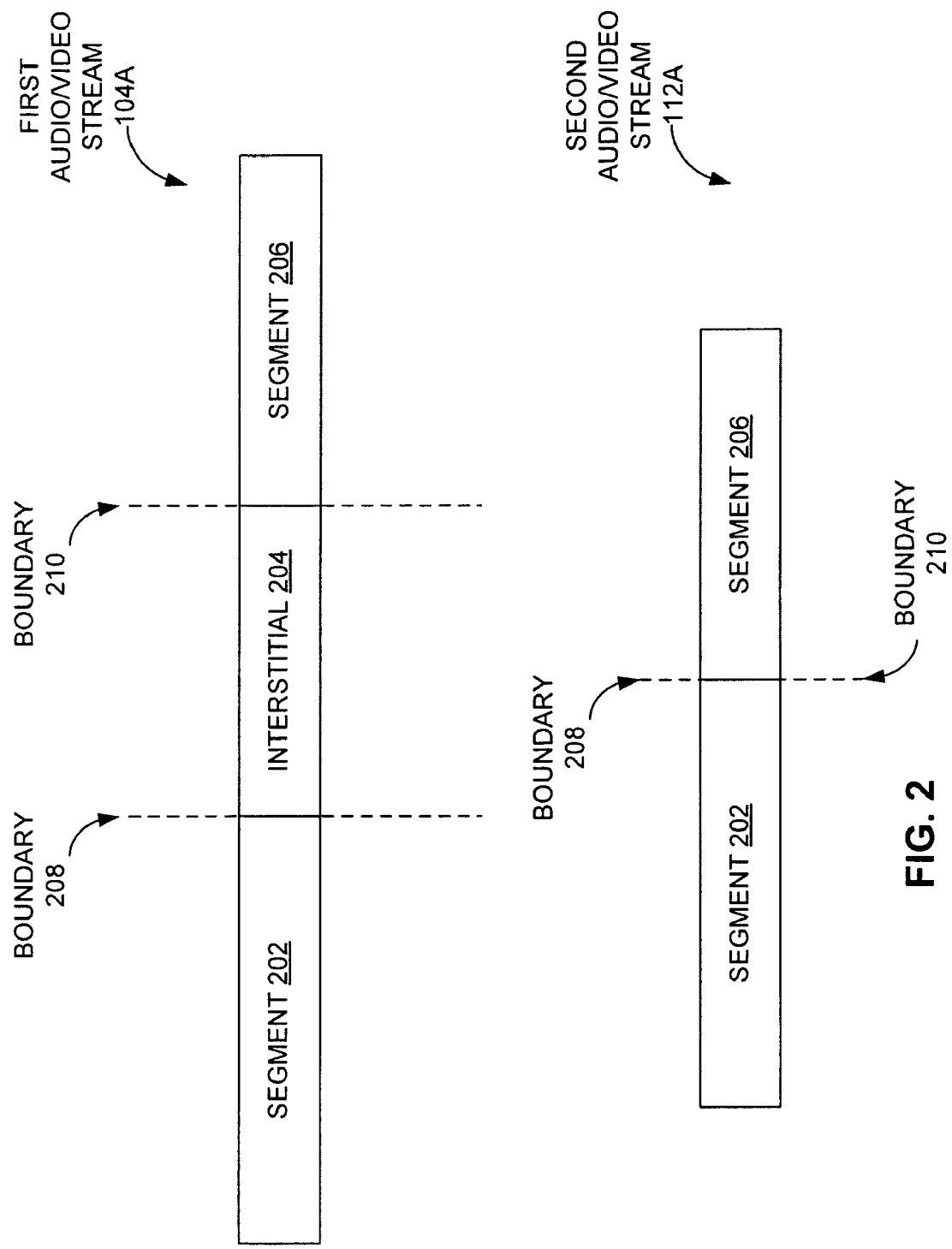
FIG. 2 illustrates an embodiment of a graphical representation of the first audio/video stream received by the receiving device, and a second audio/video stream outputted by the receiving device.

FIG. 2 illustrates an embodiment of a graphical representation of the first audio/video stream 104A received by the receiving device 110 and a second audio/video stream 112A outputted by the receiving device 110. More particularly, FIG. 2 illustrates an embodiment in which an interstitial is filtered from the first audio/video stream 104A during presentation of the second audio/video stream 112A. FIG. 2 will be discussed in reference to the system 100 of FIG. 1.

The first audio/video stream 104 includes a first audio/video segment 202 of a show, an interstitial 204 and a second audio/video segment 206 of the show. Also indicated are beginning and ending boundaries 208 and 210 of the interstitial 204, which are indicated to the receiving device 110 (see FIG. 1) by way of the location information 106. It is to be recognized that the boundaries 208 and 210 of the interstitial 204 are also boundaries of the segments 202 and 206. The supplemental data of the audio/video stream 104A is not shown in FIG. 2 to simplify the diagram.

In the specific example of FIG. 2 the boundary 208 (e.g., the ending boundary of segment 202) is the starting point at which the interstitial 204 is to be filtered from the first audio/video stream 104A. Likewise, the boundary 210 (e.g., the beginning boundary of segment 206) is the ending point at which the interstitial 204 is to be filtered from the first audio/video stream 104A. As a result of the filtering, a second audio/video stream 112A is produced, in which the second segment 206 is outputted immediately following the first segment 202.

The boundaries 208 and 210 are identified based on the location of one or more video locations within the first audio/video stream 104A. More particularly, the beginning and ending boundaries of a segment (or interstitial) of the first audio/video stream 104A may be specified by a single video location within the segment. Thus, each segment may be identified by a unique video location within the first audio/video stream 104A.

To specify a video location within the first audio/video stream 104A, the location information 106 references a portion of the text data associated with the first audio/video stream 104A. A video location within the first audio/video stream 104A may be identified by a substantially unique text string within the text data that may be unambiguously detected by the receiving device 110. The text data may consist of a single character, several characters, an entire word, multiple consecutive words or the like. Thus, the receiving device 110 may review the text data to identify the location of the unique text string. Because the text string in the text data is associated with a particular location within the first audio/video stream 104A, the location of the text string may be referenced to locate the video location within the first audio/video location.

In some embodiments, multiple video locations may be utilized to specify the beginning and ending boundaries of a segment. In at least one embodiment, a single video location is utilized to identify the beginning and ending boundaries of a segment. The video location may be located at any point within the segment, and offsets may be utilized to specify the beginning and ending boundaries of the segment relative to the video location. In one implementation, a human operator, of a content provider of the first audio/video stream 104A, bears responsibility for selecting the text string, the video location and/or the offsets. In other examples, the text string, video location and offset selection occurs automatically under computer control, or by way of human-computer interaction. A node within the communication network 102 may then transmit the selected text string to the receiving device 110 as the location information 106, along with the forward and backward offset data.

Figure 3:
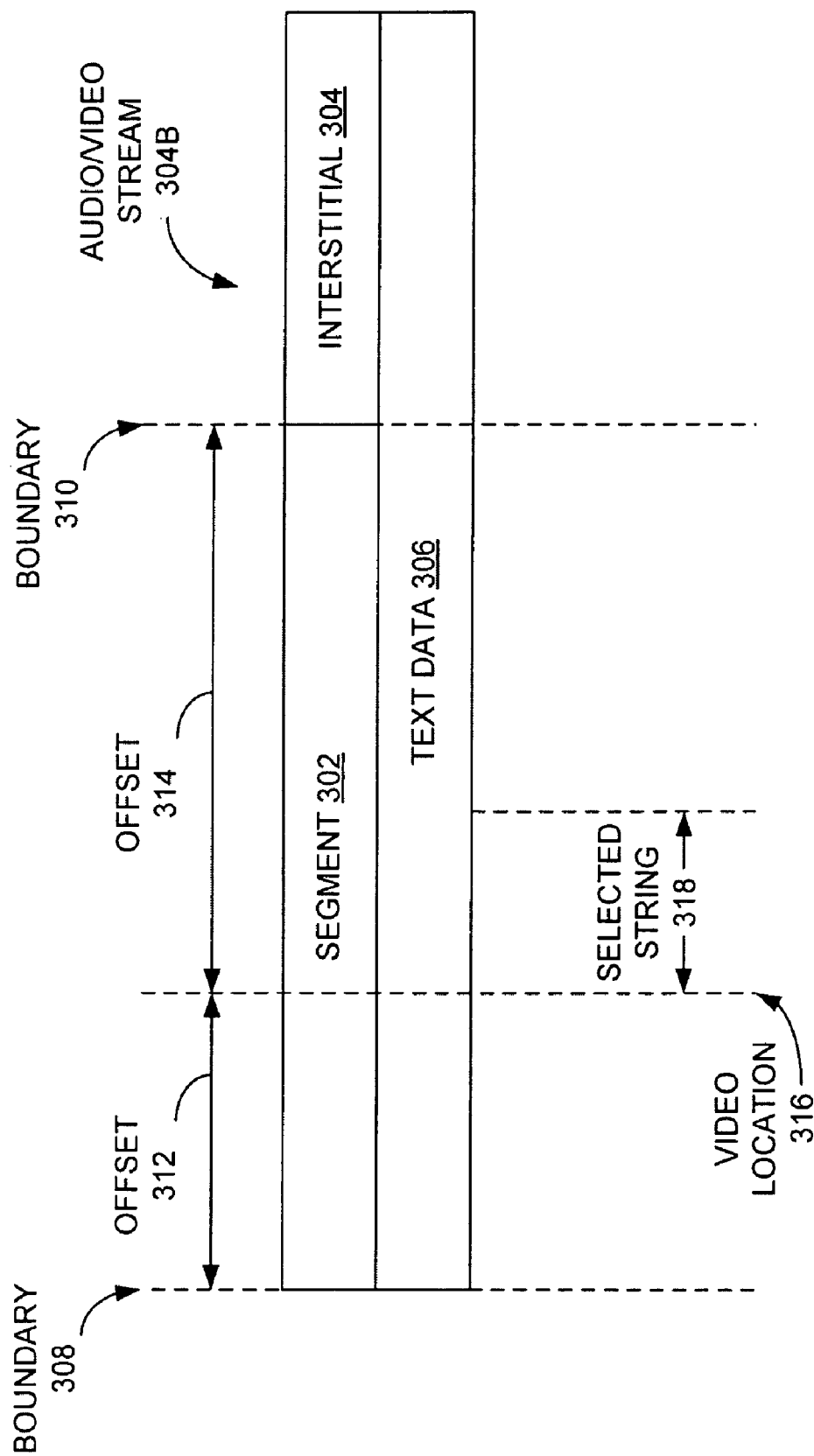
FIG. 3 illustrates an embodiment in which the boundaries of a segment of an audio/video stream are identified based on a text string included with the text data associated with the audio/video stream.

FIG. 3 illustrates an embodiment in which the boundaries of a segment of an audio/video stream 104B are identified based on a text string included with the text data associated with the audio/video stream 104B. FIG. 3 will be discussed in reference to system 100 of FIG. 1. The audio/video stream 104B includes a segment 302, an interstitial 304 and text data 306. The segment 302 is defined by a boundary 308 and a boundary 310. The location information 106 received by the receiving device 110 identifies the segment 302 using a selected string 318 and offsets 312 and 314. Each of these components is discussed in greater detail below.

The receiving device 110 reviews the text data 306 to locate the selected string 318. As illustrated in FIG. 3, the selected string 318 is located at the video location 316. More particularly, in at least one embodiment, the beginning of the selected string 318 corresponds with the frame located at the video location 316. After locating the video location 316, the receiving device 110 utilizes the negative offset 312 to identify the beginning boundary 308. Likewise, the receiving device 110 utilizes the positive offset 314 to identify the ending boundary 310. The offsets 312 and 314 are specified relative to the video location 316 to provide independence from the absolute presentation times of the video frames associated with the boundaries 308 and 310 within the audio/video stream 104B. For example, two users may begin recording a particular program from two different affiliates (e.g., one channel in New York City and another channel in Atlanta). Thus, the absolute presentation time of the boundaries 308 and 310 will vary within the recordings. The techniques described herein locate the same video frames associated with the boundaries 308 and 310 regardless of their absolute presentation times within a recording.

In at least one embodiment, the receiving device 110 filters the content of the audio/video stream 104B by outputting the video content of segment 302, while omitting from the presentation the interstitial 304 located outside of the boundaries 308 and 310. In some embodiments, the receiving device 110 may output the video content within the boundaries 308 and 310 and may also present video content within another set of similar boundaries 308 and 310, thus omitting presentation of the interstitial 304.

In at least one embodiment, a receiving device 110 identifies a set of boundaries 308 and 310 for a portion of the audio/video stream 104, and omits presentation of the content within the boundaries while presenting the other video content that is outside of the boundaries 308 and 310. For example, a user may watch the commercials within a football game, while skipping over the actual video content of the football game.

Depending on the resiliency and other characteristics of the text data, the node of the communication network 102 generating and transmitting the location information 106 may issue more than one instance of the location information 106 to the receiving device 110. For example, text data, such as closed captioning data, is often error-prone due to transmission errors and the like. As a result, the receiving device 110 may not be able to detect some of the text data, including the text data selected for specifying the video location 316. To address this issue, multiple unique text strings may be selected from the text data 306 of the audio/video stream 104B to indicate multiple video locations (e.g., multiple video locations 316), each having a different location in the audio/video stream 104B. Each string has differing offsets relative to the associated video location that point to the same boundaries 308 and 310. The use of multiple text strings (each accompanied with its own offset(s)) may thus result in multiple sets of location information 106 transmitted over the communication network 102 to the receiving device 110, each of which is associated with the segment 302. Each set of location information 106 may be issued separately or may be transmitted in one more sets.

The techniques described above typically allow the same autonomous location information to be provided to viewers of multiple affiliates. For example, an entity generating the autonomous location information may process a feed received in New York City to generate the autonomous location information. Because the actual content of the show doesn't typically change, the same autonomous location information can be used throughout the United States in relation to feeds recorded from multiple channels. Thus, even though the feeds may be different, e.g., different starting times and different commercial content, the relationship between an identified location in a segment and the boundaries of the segment doesn't typically change. This allows the same autonomous location to be used in many different markets.

However, a problem arises if the text data becomes shifted in relation to the associated video frames. For example, an affiliate in Chicago may shift the closed captioning data in relation to the associated video frames by two seconds. To a viewer, this shift may not be noticeable, as the user is reading the text data in real-time. However, because of the shift, the autonomous location information generated based on the New York City feed will cause the boundary of the corresponding segment to become shifted by two seconds.

This problem can be remedied by processing performed by the receiving device 110 that determines whether an identified location corresponds with a boundary of a segment. More particularly, in at least one embodiment, the receiving device 110 processes the audio/video data at the identified location to determine whether the audio/video data possesses specific characteristics. For example, the receiving device 110 may determine whether the audio/video data at the identified location comprises a substantially black screen or muted audio, which typically corresponds with a video transition. If the identified location does not correspond with a boundary, then another location temporally near the identified location may be selected and checked to determine whether the selected location corresponds with the boundary of the segment.

An iterative process may be performed where multiple locations are checked to identify a location that corresponds with the boundary of the segment. The recursive process may include checking locations that are temporally forward and/or backward from the identified location depending on desired design criteria. Further, different traversal processes may be employed depending on characteristics of the audio/video stream, desired design criteria and the like.

Figure 4:
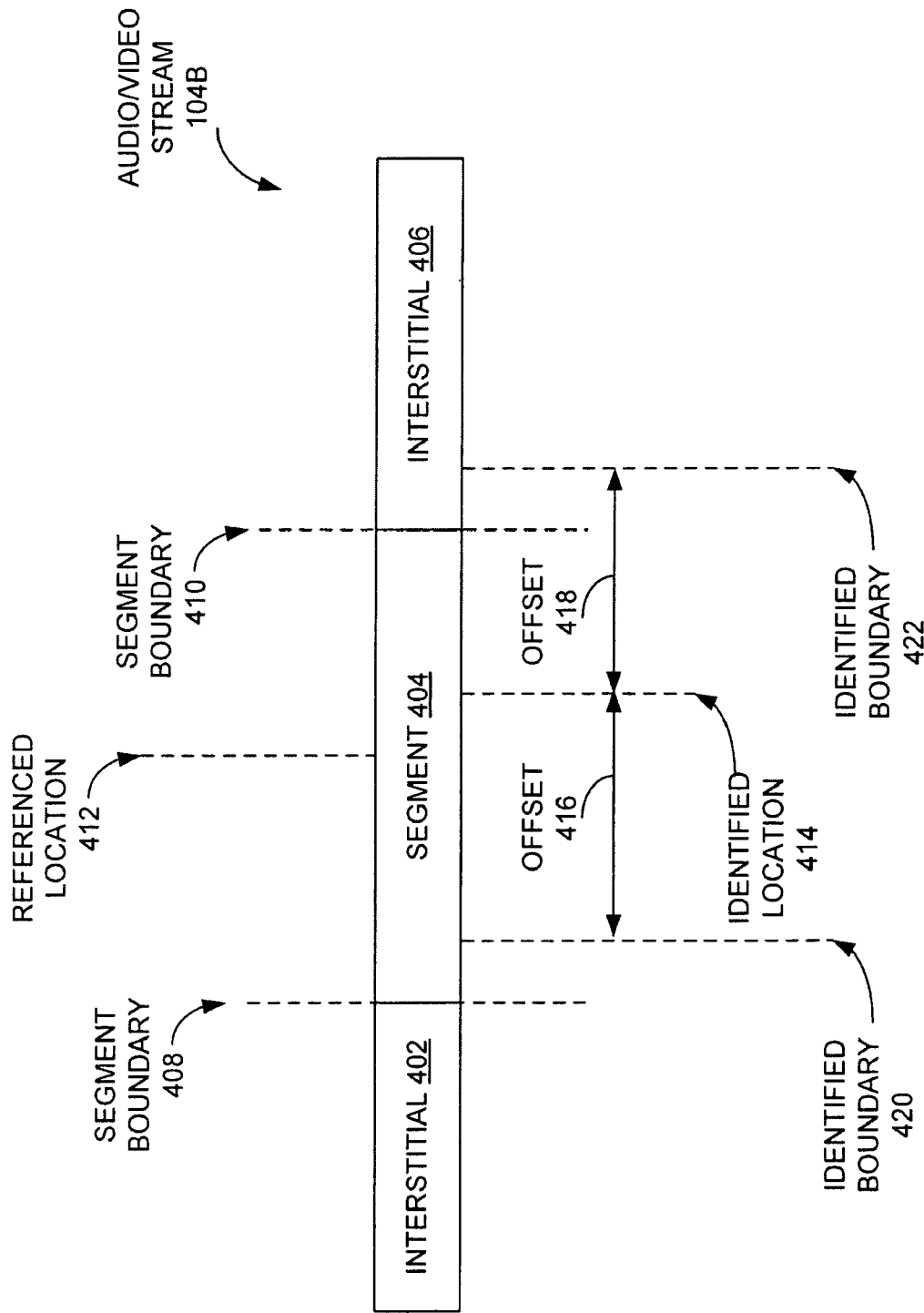
FIG. 4 illustrates an embodiment of an audio/video stream with text data shifted from the corresponding video location.

FIG. 4 illustrates an embodiment of an audio/video stream 104C with text data shifted from the corresponding video location. More particularly, FIG. 4 illustrates the aforementioned identification problem caused by the shifted text data. FIG. 4 will be discussed in reference to the communication system 100 described in FIG. 1.

The audio/video stream 104C includes an interstitial 402, a segment 404 and another interstitial 406. The segment 404 is surrounded on each side by the interstitials 402 and 406 at the segment boundaries 408 and 410. The receiving device 110 receives the autonomous location information, which is intended to reference location 412. However, due to a shift in the text data, the receiving device 110 processes the text data and identifies the location 414, which corresponds with the presentation location of the text data in the audio/video stream 104B.

The autonomous location information 108 further includes offsets 416 and 418, which when specified relative to the reference location 412, correspond with the segment boundaries 408 and 410. However, as illustrated in FIG. 4, the offsets 416 and 418, when measured relative to the identified location 414, do not correspond with the segment boundaries 408 and 410. Rather, the offsets 418 and 418, when measured relative to the identified location 414, point to the identified boundaries 420 and 422.

Responsive to identifying the identified boundaries 420 and 422, the receiving device 110 performs one or more operations to determine whether the identified boundary 420 and/or the identified boundary 422 correspond with the segment boundary 408 and/or 410. More particularly, the receiving device 110 determines whether the audio/video data at the identified boundary 420 and/or 422 possesses a particular characteristic corresponding with a video transition.

For example, the receiving device 110 may determine whether video data at the identified boundary 420 corresponds with a substantially black or blank screen. It is to be appreciated that some affiliates may include a station identifier (e.g., a bug) in a feed at all times, even when transitioning between segments of a show and commercials. Thus, the receiving device 110 may determine whether the screen is substantially black, e.g., the screen includes the bug but otherwise does not include non-black video data.

In at least one embodiment, a particular portion of the screen, e.g., a middle portion may be processed to determine whether the particular portion of the screen is black. If the particular portion of the screen is determined to include all black video data or substantially black data, then a determination may be made that the entire frame is substantially black. In at least one embodiment, an average value of the color of the screen may be processed to determine whether the average is within a specified tolerance of a value indicating a substantially black or blank screen.

In another embodiment, the receiving device 110 may determine whether the audio data corresponding with the identified boundary 420 comprises muted audio data. Thus, if the audio data is not muted, then it is likely that the identified boundary 420 does not correspond with the segment boundary. A similar process may be performed with the audio and/or video data at the identified boundary 422.

Figure 5:
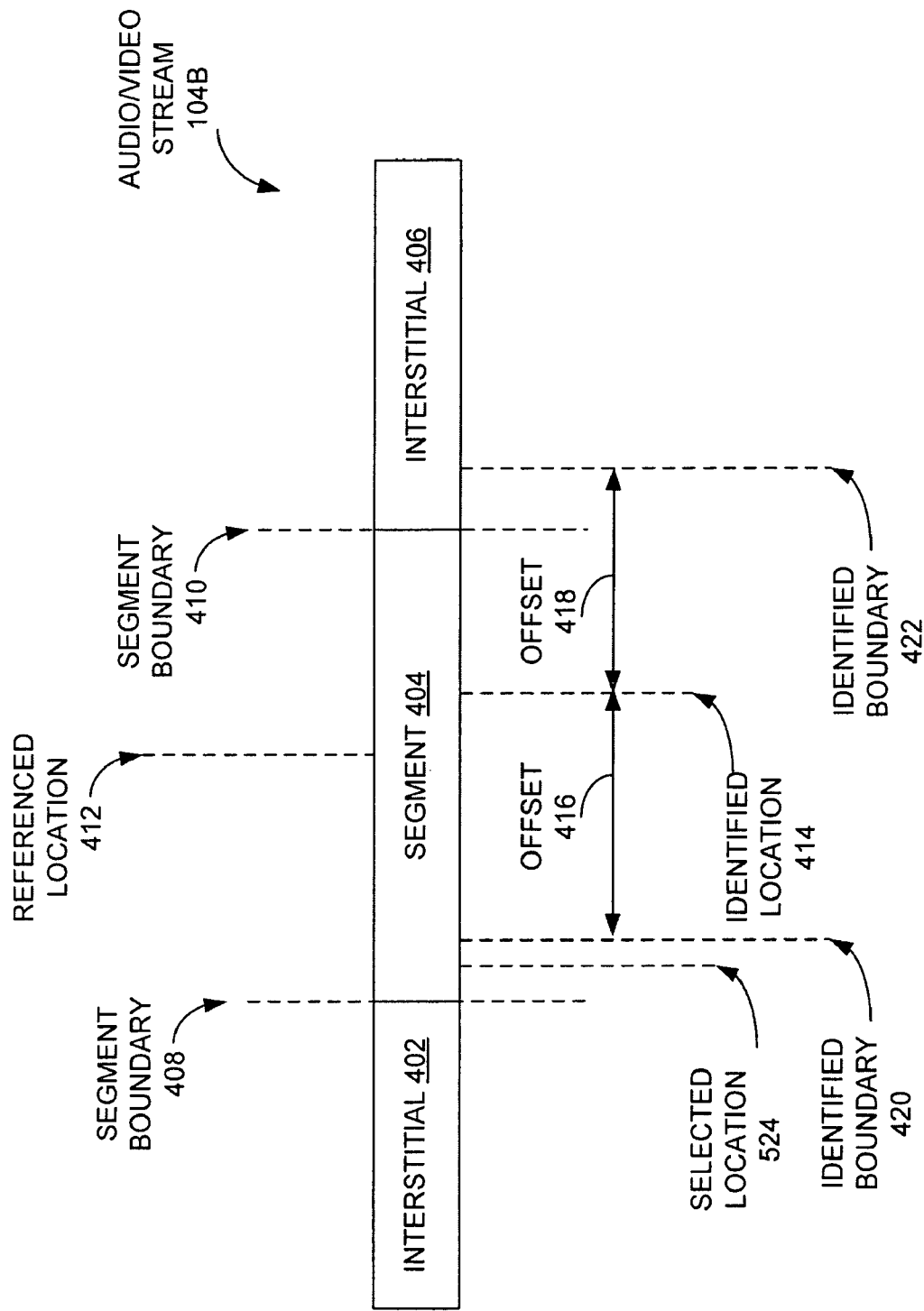
FIG. 5 illustrates an embodiment of an audio/video stream which includes a selected location that is temporally backwards from the identified boundary.

If the identified boundary 420 and/or 422 is determined not to correspond with the segment boundaries 408 and/or 410, then another location may be selected that is temporally near the identified boundary 420 and/or 422. The selected location may be identified based on any design criteria. For example, the identified location may be identified by moving a specified temporal off-set in either temporal direction from the identified boundary. FIG. 5 illustrates an embodiment of an audio/video stream 104B which includes a selected location 524 that is temporally backwards from the identified boundary 420.

The selected location 524 is then processed to determine whether the corresponding audio/video data possesses a specified characteristic as described above. If the selected location 524 is determined to possess the specified characteristic, then the receiving device can determine a shift offset of the text data, which corresponds with the difference between the segment boundary 408 and the identified boundary 420. Otherwise, if the selected location 524 is determined to not correspond with the segment boundary 408, then another location may be selected until the segment boundary is located.

In at least one embodiment, responsive to locating the segment boundary 408, the receiving device 110 may determine a shift offset between the identified boundary 420 and the segment boundary 408 or a shift offset between the referenced location 412 and the identified location 414. This information may be used to shift the offset 418 relative to the identified location 414. In other embodiments, separate processing operations may be performed to determine a shift offset between the segment boundary 410 and the identified boundary 422.

Thus, in accordance with the techniques described herein, a receiving device 110 may utilize the segment identification technique described above and may independently correct for differences in the presentation location of text data associated with the video stream 104C. This allows a content provider to issue a single set of autonomous location information in multiple markets for utilization for processing multiple feeds of the same television program from different affiliates. If the presentation of text data differentiates between multiple affiliates for any reason, then the receiving device 110 is able to self-correct the problem without receiving additional information or commands from the content provider.

As described above, there are various techniques for determining how to select additional locations temporally near an identified boundary 420 responsive to determining that the identified boundary 420 does not correspond with a segment boundary. For example, the receiving device 110 may select successive frames temporally forward from the identified boundary 420 and may proceed with processing each successive frame until a selected location is identified that corresponds with the segment boundary. In another embodiment, the receiving device 110 may perform the same process in a temporally reverse direction from the identified boundary 420. In some embodiments, the receiving device 110 may proceed with processing frames up to a specified temporal off-set away from the identified boundary 420, e.g., 5 seconds. For example, the receiving device 110 may process each frame in a forward direction up to a frame temporally 5 seconds from the identified boundary 420, and may then begin processing each frame in a reverse direction up to a frame temporally 5 seconds from the identified boundary 420. In at least one embodiment, if the segment boundary 408 is not located within the specified search off-sets in either temporal direction, then the receiving device proceeds within using the identified boundary 420.

In at least one embodiment, the receiving device 110 may start searching a specified temporal off-set away from the identified boundary, e.g., 1 second or 100 milliseconds, depending on desired design criteria. The search may begin in either temporal direction from the identified boundary. In some embodiments, the receiving device 110 may search in both temporal directions contemporaneously. For example, the receiving device 110 may initially select a frame in a forward temporal direction 10 milliseconds from the identified boundary. If the selected location does not correspond with the segment boundary 408, then the receiving device 110 may select a frame in a reverse temporal direction 10 milliseconds from the identified boundary. The process may continue by alternating temporal directions while moving outward from the identified boundary 420 until the segment boundary 408 is located.

In the simplest case, every segment of a television program is shifted the same temporal off-set from the boundaries referenced by the autonomous location information 108. For example, the closed captioning data may be presented shifted 3 seconds from the corresponding video data in the audio/video stream. Thus, in at least one embodiment, the receiving device 110 may process one of the identified boundaries 420 to determine the shift-offset of the text data. The shift off-set may then be applied to each location identified by the receiving device 110 based on processing the text data to select the proper location identified by the autonomous location information 108.

Figure 6:
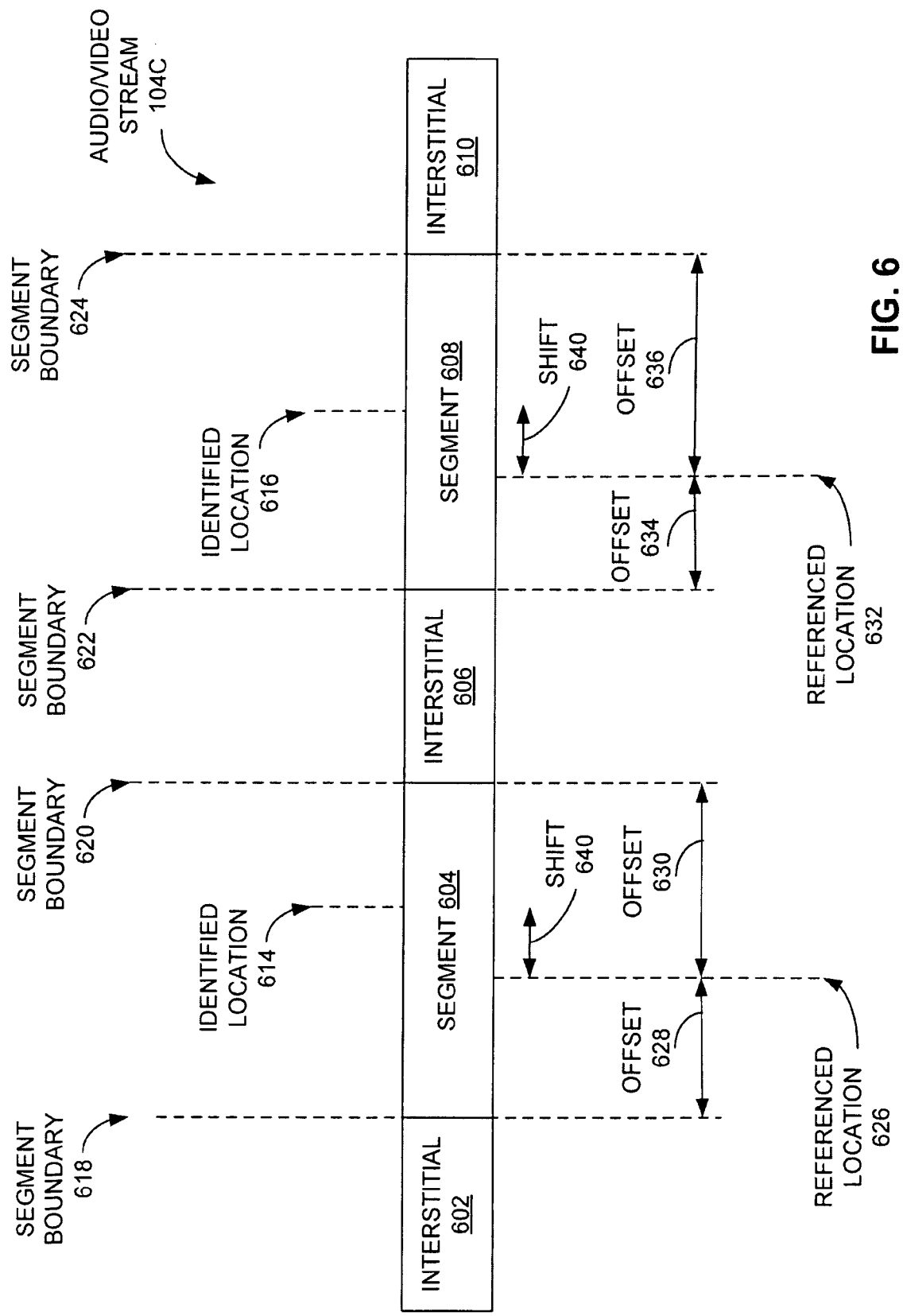
FIG. 6 illustrates an embodiment of a multiple segment audio/video stream.

FIG. 6 illustrates an embodiment of a multiple segment audio/video stream 104C. More particularly, FIG. 6 illustrates an audio/video steam 104C in which the text data has been shifted from the corresponding video data. FIG. 6 will be discussed in reference to the communication system 100 of FIG. 1.

The audio/video stream 104C includes segment 604 and segment 608 interspersed between the interstitials 602, 606 and 610. More particularly, the segment 604 is separated from the interstitial 602 by the segment boundary 618 and separated from the interstitial 606 by the segment boundary 620. Similarly, the segment 608 is separated from the interstitial 606 by the segment boundary 622 and separated from the interstitial 610 by the segment boundary 624.

The receiving device 110 processes the text data associated with the audio/video stream 104C based on the autonomous location information 108 to identify the identified locations 614 and 616, which correspond with the segments 604 and 608, respectively. However, the autonomous location information 108 is intended to identify the segment boundaries 618 and 620 based on the referenced location 626 and identify the segment boundaries 622 and 624 based on the referenced location 632. As illustrated in FIG. 6, the identified locations 614 and 616 are shifted from the referenced locations 626 and 632 because of the delay in the presentation times of the text data.

To remedy this problem, the receiving device 110 employs the process described above to identify the shift 640 between the identified location 614 and the referenced location 626. The shift 640 identifies the offset between the presentation of the text data and the corresponding video data in the audio/video stream 104C. The shift 640 is then utilized to identify the referenced location 626 from the autonomous location information 114. Based upon the referenced location 626, the receiving device 110 uses the offsets 628 and 630 from the autonomous location information 110 to identify the segment boundaries 618 and 620.

The receiving device 110 may use the same shift 640 in processing other segments without analyzing the identified boundaries measured relative to the identified location 616. Rather, the receiving device 110, in at least one embodiment, operates by applying the same shift 640 of the text data throughout the audio/video stream 104C. The receiving device 110 applies the shift 640 to the identified location 616 to identify the referenced location 632 of the second segment. Based upon the referenced location 632, the receiving device 110 identifies the segment boundaries 622 and 624 of the second segment using the offsets 634 and 636 specified in the autonomous location information 108.

Applying the shift of any of the segments in an audio/video stream to other segments of the audio/video stream 104C is one technique for determining the shift text data for each segment. Another technique involves computing an average shift value for each segment. For example, the receiving device may compute the shift 640 between the identified location 614 and the referenced location 626 for a first segment as described in reference to FIG. 6. Further, the receiving device 110 may perform a similar process to compute a shift for another segment of the audio/video stream. In at least one embodiment, the computed shifts are averaged and the averages may be applied throughout the audio/video stream relative to the identified locations 614 and 616 to select the referenced locations 626 and 632, respectively.

In another embodiment, several shifts may be computed for different segments and averaged, with the average shift being applied to other segments of the audio/video stream. For example, the audio/video stream may comprise ten distinct segments interspersed with interstitials. The receiving device 110 may compute the actual shift of the text data in each of the first three segments. The three shift values may be averaged together and applied to the remaining seven segments of the program. Thus, the receiving device does not need to expend computational resources for processing the characteristics of the audio/video data of the remaining seven segments of the audio/video stream. It is to be appreciated that any of the segments may be utilized for processing to compute actual shifts depending on desired design criteria.

In at least one embodiment, each of the segments may be processed separately to determine the shift offset between the text data and the corresponding video data. However, any of the preceding shift values may be used as a starting processing point for a particular segment. For example, a first segment may have the text data shifted by 0.5 seconds in a forward temporal direction from an identified location for the segment. When processing the next segment, the receiving device 110 may begin by searching a location that is 0.5 seconds in a forward temporal direction from an identified location for the segment to locate the referenced location for the segment. In at least one embodiment, an average of the proceeding computed shifts may be utilized as a starting search point for the referenced location of a segment. It is to be appreciated that any combination of the aforementioned search techniques may be utilized to determine the offset for particular segments of an audio/video stream depending on desired design criteria.

Figure 7:
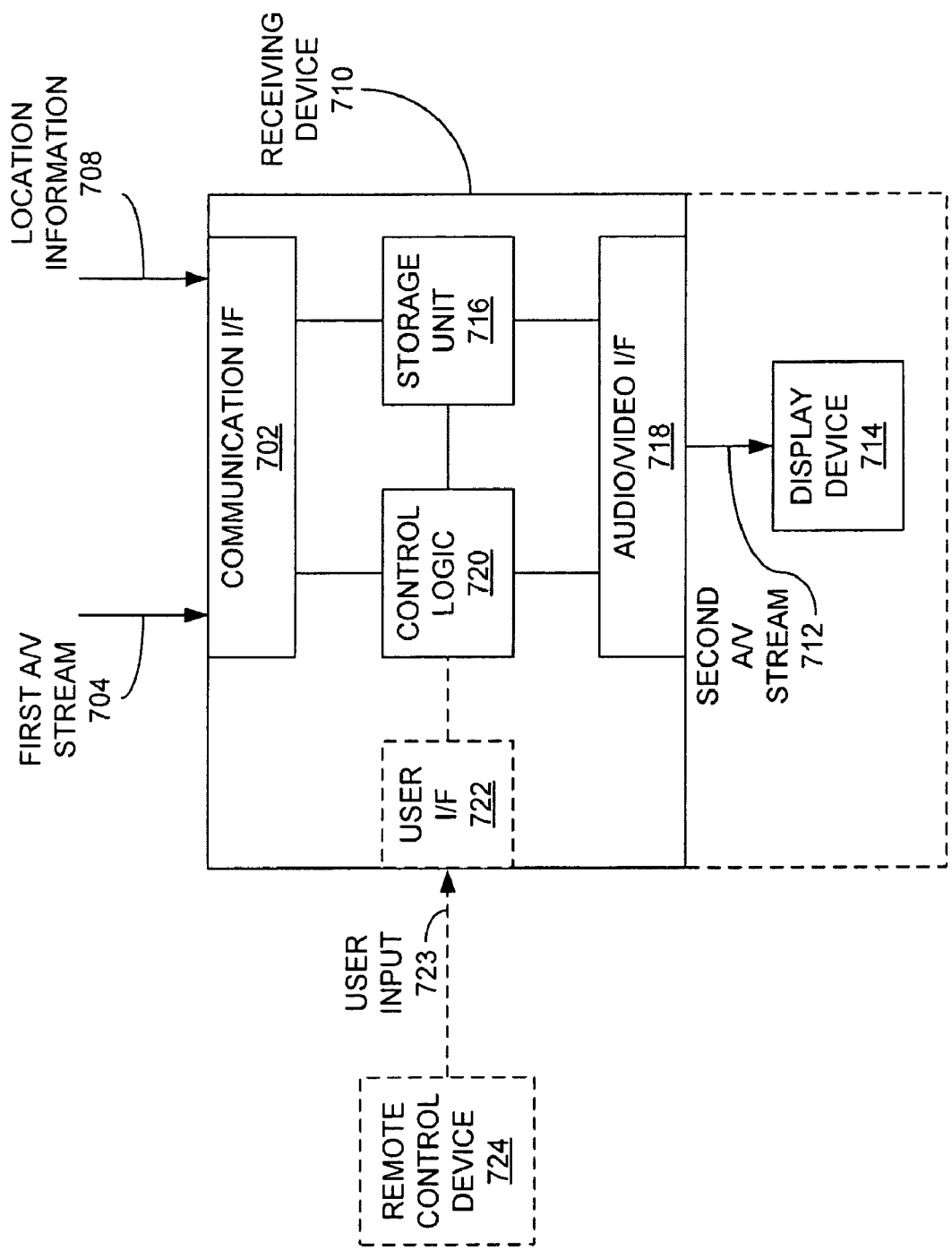
FIG. 7 illustrates a more explicit view of a receiving device according to one embodiment

A more explicit view of a receiving device 710 according to one embodiment is illustrated in FIG. 7. The receiving device 710 includes a communication interface 702, a storage unit 716, an audio/video interface 718 and control logic 720. In some implementations, a user interface 722 may also be employed in the receiving device 710. Other components possibly included in the receiving device 710, such as demodulation circuitry, decoding logic, and the like, are not shown explicitly in FIG. 7 to facilitate brevity of the discussion.

The communication interface 702 may include circuitry to receive a first audio/video stream 704, substitute content 706 and location information 708. For example, if the receiving device 710 is a satellite set-top box, then the communication interface 702 may be configured to receive satellite programming, such as the first audio/video stream 704, via an antenna from a satellite transponder. If, instead, the receiving device 710 is a cable set-top box, then the communication interface 702 may be operable to receive cable television signals and the like over a coaxial cable. In either case, the communication interface 702 may receive the location information 708 by employing the same technology used to receive the first audio/video stream 704. In another implementation, the communication interface 702 may receive the location information 708 by way of another communication technology, such as the internet, a standard telephone network or other means. Thus, the communication interface 702 may employ one or more different communication technologies, including wired and wireless communication technologies, to communicate with a communication network, such as the communication network 102 of FIG. 1.

Coupled to the communication interface 702 is a storage unit 716, which is configured to store both the first audio/video stream 704 and/or the location information 708. The storage unit 716 may include any storage component configured to store one or more such audio/video streams. Examples include, but are not limited to, a hard disk drive, an optical disk drive, and flash semiconductor memory. Further, the storage unit 716 may include either or both volatile and non-volatile memory.

Communicatively coupled with the storage unit 716 is an audio/video interface 718, which is configured to output audio/video streams from the receiving device 710 to a display device 714 for presentation to a user. The audio/video interface 718 may incorporate circuitry to output the audio/video streams in any format recognizable by the display device 714, including composite video, component video, digital visual interface (DVI), high-definition multimedia interface (HDMI), digital living network alliance (DLNA), Ethernet, multimedia over coax alliance (MOCA), WiFi and IEEE 1394. Data may be compressed and/or transcoded for output to the display device 714. The audio/video interface 718 may also incorporate circuitry to support multiple types of these or other audio/video formats. In one example, the display device 714, such as a television monitor or similar display component, may be incorporated within the receiving device 710, as indicated earlier.

In communication with the communication interface 702, the storage unit 716, and the audio/video interface 718 is control logic 720 configured to control the operation of each of these three components 702, 716, 718. In one implementation, the control logic 720 includes a processor, such as a microprocessor, microcontroller, digital signal processor (DSP) or the like for execution of software configured to perform the various control functions described herein. In another embodiment, the control logic 720 may include hardware logic circuitry in lieu of, or in addition to, a processor and related software to allow the control logic 720 to control the other components of the receiving device 710.

Optionally, the control logic 720 may communicate with a user interface 722 configured to receive user input 723 directing the operation of the receiving device 710. The user input 723 may be generated by way of a remote control device 724, which may transmit the user input 723 to the user interface 722 by the use of, for example, infrared (IR) or radio frequency (RF) signals. In another embodiment, the user input 723 may be received more directly by the user interface 722 by way of a touchpad or other manual interface incorporated into the receiving device 710.

The receiving device 710, by way of the control logic 720, is configured to receive the first audio/video stream 704 by way of the communication interface 702, and store the audio/video stream 704 in the storage unit 716. The receiving device 710 is also configured to receive the location information 708 over the communication interface 702, possibly storing the substitute content 706 in the storage unit 716 as well. At some point alter the location information 708 is processed, the control logic 720 generates and transmits a second audio/video stream 712 over the audio/video interface 718 to the display device 714. In one embodiment, the control logic 720 generates and transmits the second audio/video stream 712 in response to the user input 723. For example, the user input 723 may command the receiving device 710 to output the first audio/video stream 704 to the display device 714 for presentation. In response, the control logic 720 instead generates and outputs the second audio/video stream 712. As described above in reference to FIG. 1, the second audio/video stream 712 includes portions of the audio/video data of the first audio/video stream 704, with portions of the first audio/video stream 704 being filtered during the presentation.

In some embodiments, substitute content may replace portions of the original audio/video content of the first audio/video stream 704 at locations specified in the location information 708, as described in detail above with respect to the first audio/video stream 104 of FIG. 1. For example, the first audio/video stream 704 may include commercials which are replaced by newer or more relevant commercials. In another embodiment, the first audio/video stream 704 includes portions of a movie that are not appropriate for viewing by children. Substitute content may be utilized to replace these portions of the first audio/video stream 704 with more appropriate portions of video content for output in the second audio/video stream 712. In other embodiments, substitute content may be utilized to augment portions of the first audio/video stream 704 which are presented as part of the second audio/video stream 712.

Depending on the implementation, the second audio/video stream 712 may or may not be stored as a separate data structure in the storage unit 716. In one example, the control logic 720 generates and stores the entire second audio/video stream 712 in the storage unit 716. The control logic 720 may further overwrite the first audio/video stream 704 with the second audio/video stream 712 to save storage space within the storage unit 716. Otherwise, both the first audio/video stream 704 and the second audio/video stream 712 may reside within the storage unit 716.

In another implementation, the second audio/video stream 712 may not be stored separately within the storage unit 716. For example, the control logic 720 may instead generate the second audio/video stream 712 "on the fly" by transferring selected portions of the audio data and the video data of the first audio/video stream 704 in presentation order from the storage unit 716 to the audio/video interface 718. Where substitute content is inserted into the second audio/video stream 712, at the point at which substitute content indicated by the location information 708 is to be outputted, the control logic 720 may then cause the substitute content to be transmitted from the storage unit 716 to the audio/video interface 718 for output to the display device 714. Once the last of the substitute content has been transferred from the storage unit 716, the control logic 720 may cause remaining portions of the first audio/video stream 704 which are to be presented to a user to be outputted to the audio/video interface 718 for presentation to the display device 714.

In one implementation, a user may select by way of the user input 723 whether the first audio/video stream 704 or the second audio/video stream 712 is outputted to the display device 714 by way of the audio/video interface 718. In another embodiment, a content provider of the first audio/video stream 704 may prevent the user from maintaining such control by way of additional information delivered to the receiving device 710.

If more than one portion of substitute content is available in the storage unit 716 to replace a specified portion of the audio/video of the first audio/video stream 704 or augment the first audio/video stream 704, then the user may select via the user input 723 which of the substitute content are to replace the corresponding portion of the audio data of the first audio/video stream 704 upon transmission to the display device 714. Such a selection may be made in a menu system incorporated in the user interface 722 and presented to the user via the display device 714. In other embodiments, the control logic 720 may select the substitute content based on various criteria, such as information specified in the location information 708, user characteristics such a demographic information or user viewing characteristics.

Figure 8:
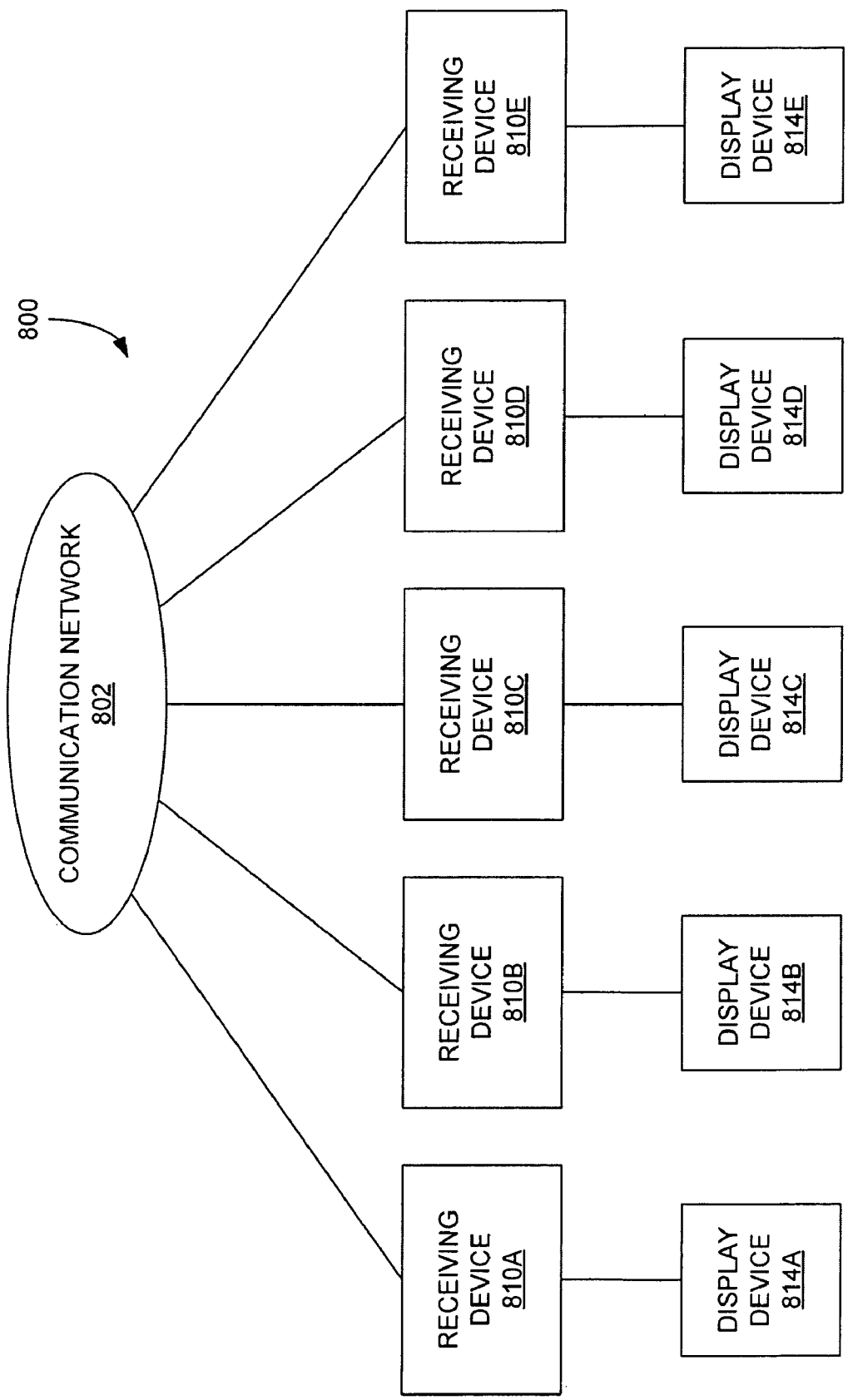
FIG. 8 illustrates an embodiment of a system for providing a broadcast environment.

In a broadcast environment, such as that depicted in the system 800 of FIG. 8, multiple receiving devices 810A-E may be coupled to a communication network 802 to receive audio/video streams, any of which may be recorded, in whole or in part, by any of the receiving devices 810A-E. In conjunction with any number of these audio/video streams, substitute content serving to replace content in an audio/video stream or to augment content in an audio/video stream, as well as the location information for portions of the audio/video stream which are to be skipped and/or presented to a user, may be transferred to the multiple receiving devices 810A-E. In response to receiving the audio/video streams, each of the receiving devices 810A-E may record any number of the audio/video streams received. For any substitute content and associated location information that are transmitted over the communication network 802, each receiving device 810A-E may then review whether the received audio/video data segments and location information are associated with an audio/video stream currently stored in the device 810A-E. If the associated stream is not stored therein, then the receiving device 810A-E may delete or ignore the related audio data segment and location information received.

In another embodiment, instead of broadcasting each possible substitute content and related location information, the transfer of an audio/video stream stored within the receiving device 810A-E to an associated display device 814a-e may cause the receiving device 810A-E to query the communication network 802 for any outstanding substitute content that apply to the stream to be presented. For example, the communication network 802 may comprise an internet connection. As a result, the broadcasting of each portion of substitute content and related location information would not be required, thus potentially reducing the amount of consumed bandwidth over the communication network 802.

Figure 9:
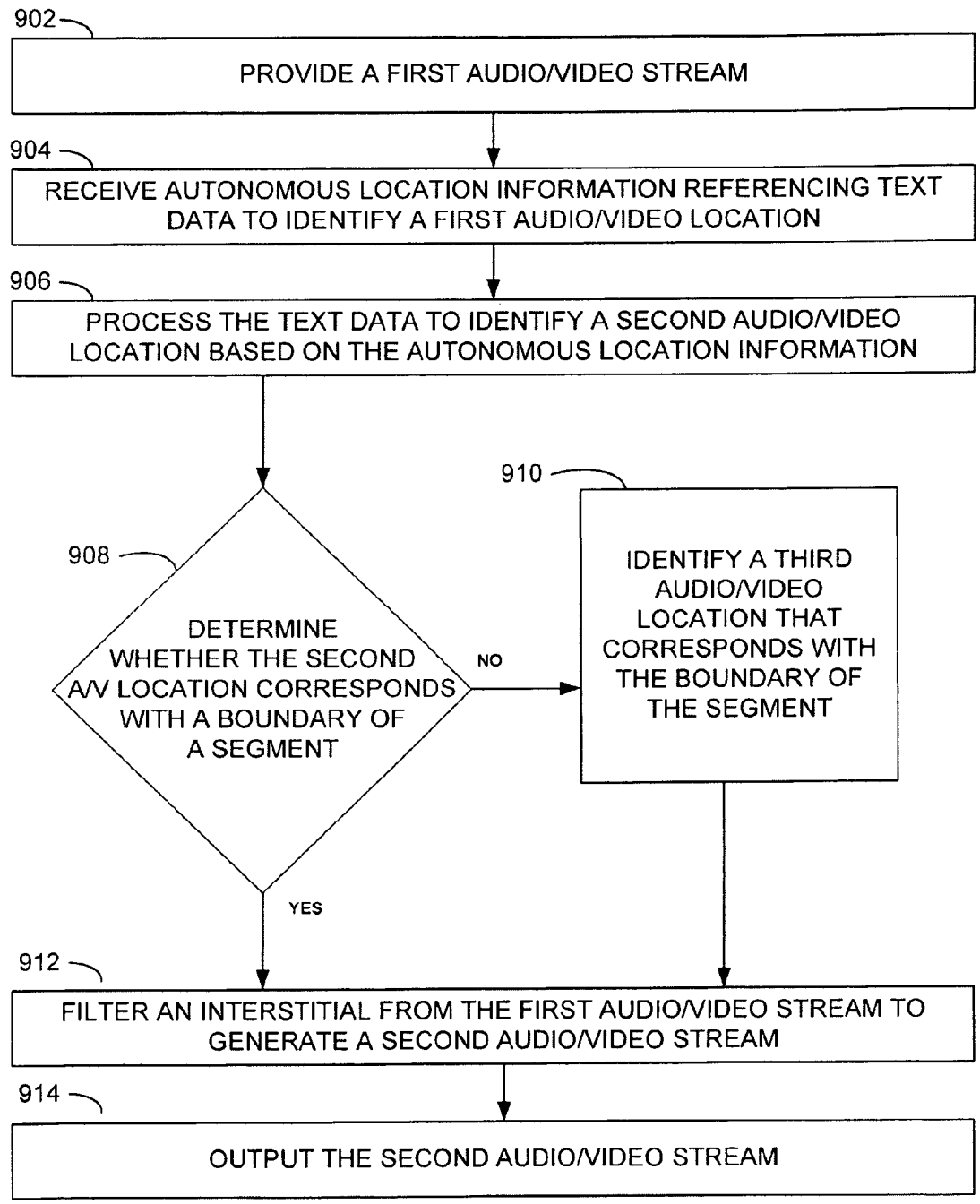
FIG. 9 illustrates an embodiment of a process for filtering an audio/video stream.

FIG. 9 illustrates an embodiment of a process for filtering an audio/video stream. The operation of FIG. 9 is discussed in reference to filtering a broadcast television program. However, it is to be appreciated that the operation of the process of FIG. 9 may be applied to filter other types of video stream content. The operations of the process of FIG. 9 are not all-inclusive, and may comprise other operations not illustrated for the sake of brevity.

The process includes providing a first audio/video stream including at least one segment of a show, at least one interstitial of the show and text data (operation 902). In at least one embodiment, operation 902 comprises recording the first audio/video stream from a transmission stream, such as a satellite, cable, over-the-air or internet broadcast or transmission. In other embodiments, operation 902 may comprise accessing the first audio/video stream from storage devices or external devices such as a disk drive, the internet or an optical storage device.

In one embodiment, the text data comprises closed captioning data associated with the first audio/video stream. Closed captioning data is typically transmitted in two or four byte intervals associated with particular video frames. Because video frames don't always arrive in their presentation order, the closed captioning data may be sorted according to the presentation order (e.g., by a presentation time stamp) of the closed captioning data. In at least one embodiment, the sorted closed captioning data may then be stored in a data file separate from the first audio/video stream.

The process further comprises receiving autonomous location information referencing the text data to identify a first audio/video location within the first audio/video stream (operation 904). The location information references the closed captioning data to identify a video location within the first audio/video stream. The location information may be utilized to filter portions of an audio/video stream, and may be further utilized to insert substitute content to locations within the audio/video stream. The autonomous location information may include off-sets specified relative to the first audio/video location that identify boundaries of a portion of the audio/video stream. Operations 902 and 904 may be performed in parallel, sequentially or in either order. For example, the location information may be received prior to recording the audio/video stream, subsequently to recording the audio/video stream, or at the same time as the audio/video stream. In at least one embodiment, the location information is received separately from the first audio/video stream.

As described above, the text data may be sorted into a presentation order and stored in a separate data file. In at least one embodiment, the sorting process is performed responsive to receiving the location information in step 904. Thus, a DVR may not perform the sorting process on the closed captioning data unless the location information used to filter the audio/video stream is available for processing. In other embodiments, the closed captioning data may be sorted and stored before the location information arrives at the DVR. For example, the sorting process may be performed in real-time during recording.

The process further includes processing the text data of the first audio/video stream to identify a second audio/video location based on the autonomous location information and the first off-set (operation 906). More particularly, a text string included within the closed captioning data may be utilized to identify a specific location within the audio/video stream (e.g., a video location). The text string may be a printable portion of the text data or may comprise formatting or display options, such as text placement information, text coloring information and the like.

The process further includes determining whether the second audio/video location corresponds with a boundary of the segment based on characteristics of the second audio/video location (operation 908). More particularly, operation 908 comprises determining whether the second audio/video location includes specified characteristics, such as muted audio or a black screen. If the second audio/video location corresponds with the boundary of the segment, then processing may continue at operation 912. Otherwise, processing proceeds with operation 910.

Operation 910 comprises identifying a third audio/video location that corresponds with the boundary of the segment responsive to determining that the second audio/video location does not correspond with the boundary. In at least one embodiment, operation 910 comprises recursively checking different locations temporally near the second audio/video location until the boundary of the segment is located. In at least one embodiment, processing then continues with operation 912.

In some embodiments, a similar process may be performed to identify a second boundary of the segment (e.g., an ending boundary). Thus, another location of the audio/video stream may be initially identified based on the location information. The process may further include identifying whether the other location corresponds with another boundary of the segment. If not, a similar process may be performed to identify the actual location of the other boundary of the segment.

Once operations 906-910 are completed, the receiving device will have identified boundaries of a portion of a program. The audio/video contained within the boundaries may then either be designated for presentation or may be skipped when the DVR outputs portions of the first audio/video stream to a display device. It is to be appreciated that operations 906-910 may identify either the boundaries of the segments of the interstitials or the segments of the show to filter the interstitials or other portions from the first audio/video stream.

The process further comprises filtering an interstitial from the first audio/video stream to generate a second audio/video stream including the segment of the show (operation 912). If the second audio/video location corresponds with the boundary of the segment, then the filtering is performed based on the second audio/video location. Otherwise, the filtering is performed based on the third audio/video location. In other words, operation 912 involves using either the second or the third audio/video location as the boundary of the segment, as the case may be.

Operations 906-910 may be performed to identify and skip portions of an audio/video stream for a variety of reasons. For example, a user may desire to skip commercials, portions of a television program or other content which is of no interest to the user, or portions of the audio/video stream which are offensive or should otherwise not be shown to certain users. The video location identified by a text string may be located within a portion of the audio/video stream that is designated for presentation (e.g., part of a television program), or may be within a portion of the audio/video stream that is designated for skipping (e.g., in a portion of the program that a user does not desire to view).

The process further includes outputting a second audio/video stream for presentation on a presentation device (operation 914). The second audio/video stream includes at least one segment of the show. Thus, in at least one embodiment, a user does not see the original interstitials of the show, but just the original segments of the show.

In another embodiment, the process may optionally include identifying substitute content to present during presentation of the audio/video stream in association with the segments of the show. Thus, the second audio/video stream includes the segment of the show and the substitute content. For example, a user does not see the original interstitials of the show, but instead sees the segments of the show interspersed with substitute content. The substitute content may be presented during playback in any logical location of the audio/video stream.

For example, the substitute content may include a lead-in ad presented before the first segment of the show. In at least one embodiment, the segments of the show may then be presented back-to-back with no additional substitute content or interstitials presented there between. Thus, for the option of automatically filtering interstitials from within the show, the user may be presented with one or more lead-in ads, which may be specifically targeted to the user. This is advantageous to a user, because they receive automatic filtering of interstitials within the show. Likewise, advertisers and/or broadcasters benefit, because this ensures that a user will see at least some form of advertisement during playback of the recording. Otherwise, a viewer could manually fast forward through all advertising, and the broadcaster and/or advertiser lose all benefit to the advertising slots within the program.

In some embodiments, the substitute content is presented at the original interstitial locations within the first audio/video stream. For example, a DVR may present video frames between beginning and ending boundaries of a segment of the show. The substitute content may then be presented after a video frame of the segment that is associated with the ending boundary. In at least one embodiment, only some of the original interstitials are replaced with substitute content. Thus, other interstitials may be filtered from the original recording during playback, or even presented to the user during playback.

Thus, through the process illustrated in FIG. 7, broadcasters, advertisers and content providers (e.g., satellite television providers and cable providers) may offer various combinations of advertisement viewing during playback of recorded content. For example, content providers and broadcasters can offer commercial free viewing of programs. In other embodiments, advertisers can offer timelier and more relevant advertising to users that the users are more likely to view. Additionally, broadcasters and service providers may offer services which allow users to skip over some commercials within a recording, as long as the users are willing to watch some replacement commercials as well. This offers a compromise between the interests of broadcasters to reap the economic benefits of their television programs, while allowing users the advantages offered by time shifting devices.

Under another scenario, some programs may contain content that some users deem offensive or objectionable. To render the program palatable to a wider range of viewers, the content provider may make alternative content segments of the program available to viewers. A user who has recorded the program may then select a milder form of the audio/video content portion for viewing.

In each of these examples, the replacement audio/video content may be made available to the receiving device after the audio/video stream has been recorded at the device, thus providing a significant level of flexibility as to when the replacement audio data is provided.

Although specific embodiments were described herein, the scope of the invention is not limited to those specific embodiments. The scope of the invention is defined by the following claims and any equivalents therein.

What is claimed is:

1. A method for processing an audio/video stream, the method comprising:
providing a first audio/video stream including at least one segment of a show, at least one interstitial of the show and closed captioning data that is shifted in time relative to the at least one segment of the show;
receiving autonomous location information referencing the closed captioning data to identify a first identified audio/video location within the first audio/video stream, wherein the first identified audio/video location is shifted in time relative to a corresponding referenced audio/video location within the first audio/video stream;
receiving a first off-set and a second off-set;
applying the first off-set to the first identified audio/video location to identify a second identified audio/video location as a possible segment boundary of the first audio/video stream;
determining whether the second identified audio/video location corresponds with a first boundary of a segment of the show based on characteristics of a video frame at the second identified audio/video location;
identifying a third identified audio/video location that corresponds with the first boundary of the segment responsive to determining that the second identified audio/video location does not correspond with the first boundary;
determining a shift offset of the closed captioning data, the shift offset corresponding to a difference between the second identified audio/video location and the third identified audio/video location;
identifying a second boundary of the segment of the show, using the first identified audio/video location, the second off-set, and the shift offset of the closed captioning data;
filtering the interstitial from the first audio/video stream based on the first boundary of the segment of the show and the second boundary of the segment of the show to generate a second audio/video stream including the segment of the show; and
outputting the second audio/video stream for presentation by a display device.

2. The method of claim 1, wherein receiving the autonomous location information, the first off-set, and the second off-set further comprise:
receiving the autonomous location information, in association with the first off-set and the second off-set, separately from the first audio/video stream.

3. The method of claim 1, wherein the autonomous location information includes at least one text string that is unique within the closed captioning data and wherein the first off-set and the second off-set are specified relative to a beginning of the text string.

4. The method of claim 1, wherein determining whether the second identified audio/video location corresponds with the first boundary of the segment further comprises:
determining whether the second identified audio/video location comprises a substantially black screen.

5. The method of claim 1, wherein determining whether the second identified audio/video location corresponds with the first boundary of the segment further comprises:
determining whether the second identified audio/video location is associated with muted audio.

6. The method of claim 1, wherein identifying the third identified audio/video location further comprises:

selecting the third identified audio/video location a specified temporal offset away from the second identified audio/video location; and determining whether the third identified audio/video location corresponds with the first boundary of the segment based on characteristics of a video frame at the third identified audio/video location.

7. The method of claim 6, wherein the third identified audio/video location is positioned the specified temporal off-set away from the second identified audio/video location in a forward temporal direction.

8. The method of claim 6, wherein the third identified audio/video location is positioned the specified temporal off-set away from the second identified audio/video location in a backward temporal direction.

9. A digital video recorder comprising:
   a communication interface that receives a first audio/video stream including at least one segment of a show, at least one interstitial of the show and closed captioning data that is shifted in time relative to the at least one segment of the show;
   a storage medium;
   control logic communicatively coupled to the communication interface and the storage medium that:
      stores the first audio/video stream on the storage medium for subsequent presentation to a user;
      receives autonomous location information referencing the closed captioning data to identify a first identified audio/video location within the first audio/video stream, wherein the first identified audio/video location is shifted in time relative to a corresponding referenced audio/video location within the first audio/video stream;
      receives a first off-set and a second off-set;
      applies the first off-set to the first identified audio/video location to identify a second identified audio/video location as a possible segment boundary of the first audio/video stream;
      determines whether the second identified audio/video location corresponds with a first boundary of a segment of the show based on characteristics of a video frame at the second identified audio/video location;
      identifies a third identified audio/video location that corresponds with the first boundary of the segment responsive to determining that the second identified audio/video location does not correspond with the first boundary;
      determines a shift offset of the closed captioning data, the shift offset corresponding to a difference between the second identified audio/video location and the third identified audio/video location;
      identifies a second boundary of the segment of the show, using the first identified audio/video location, the second off-set, and the shift offset of the closed captioning data;
      filters the interstitial from the first audio/video stream based on the first boundary of the segment of the show and the second boundary of the segment of the show to generate a second audio/video stream including the segment of the show; and
      outputs the second audio/video stream for presentation by a display device.

10. The digital video recorder of claim 9, wherein the control logic receives the autonomous location information, in association with the first off-set and the second off-set, subsequent to storing the first audio/video stream.

11. The digital video recorder of claim 9, wherein the autonomous location information includes at least one text string that is unique within the closed captioning data.

12. The digital video recorder of claim 9, wherein the control logic is configured to determine whether the second identified audio/video location comprises a substantially black screen.

13. The digital video recorder of claim 9, wherein the control logic is configured to determine whether the second identified audio/video location is associated with muted audio.

14. The digital video recorder of claim 9, wherein the control logic is configured to select the third identified audio/video location a specified temporal off-set away from the second identified audio/video location and determine whether the third identified audio/video location corresponds with the first boundary of the segment based on characteristics of a video frame at the third identified audio/video location.

15. The digital video recorder of claim 14, wherein the third identified audio/video location is positioned the specified temporal off-set away from the second identified audio/video location in a forward temporal direction.

16. The digital video recorder of claim 14, wherein the third identified audio/video location is positioned the specified temporal off-set away from the second identified audio/video location in a backward temporal direction.

17. The digital video recorder of claim 9, wherein the control logic is further configured to identify substitute content and output the substitute content as part of the second audio/video stream adjacent to the segment.

18. The digital video recorder of claim 17, wherein the control logic identifies the substitute content based on the autonomous location information.

19. A method for processing an audio/video stream, the method comprising:
   recording a first audio/video stream including a plurality of segments of a show, interstitials interspersed between the plurality of segments, and closed captioning data that is shifted in time relative to the plurality of segments;
   receiving autonomous location information referencing the closed captioning data, the autonomous location information comprising a plurality of text strings associated with the closed captioning data for one or more video frames of the first audio/video stream, wherein each of the plurality of text strings uniquely identifies a respective audio/video location within the first audio/video stream corresponding to a respective one of the plurality of segments;
   receiving a first offset and a second offset for each respective audio/video location uniquely identified by the plurality of text strings;
   for a first segment of the plurality of segments:
      reviewing the closed captioning data to locate one of the plurality of text strings in the closed captioning data and to identify a first identified audio/video location within the first audio/video stream, wherein the first identified audio/video location is shifted in time relative to a corresponding referenced audio/video location within the first audio/video stream;
      applying the first offset of the first segment to the first identified audio/video location to identify a second identified audio/video location as a possible segment boundary of the first audio/video stream;
      determining whether the second identified audio/video location corresponds with a first boundary of the first segment based on characteristics of a video frame at the second identified audio/video location; and identifying a third identified audio/video location that corresponds with the first boundary of the first segment in response to determining that the second identified audio/video location does not correspond with the first boundary of the first segment;

determining a shift offset of the closed captioning data, the shift offset corresponding to a difference between the second identified audio/video location and the third identified audio/video location;

using the shift offset of the closed captioning data to identify boundaries of other segments of the show;

filtering the interstitials from the first audio/video stream based on the identified boundaries to generate a second audio/video stream including the segments of the show; and outputting the second audio/video stream for presentation by a display device.

20. The method of claim 19, wherein, for each of the other segments of the show, using the shift offset comprises:

reviewing the closed captioning data to locate another one of the plurality of text strings in the closed captioning data and to identify a respective identified audio/video location within the first audio/video stream;

applying the shift offset to the respective identified audio/video location to identify a respective referenced audio/video location; and applying the first offset and the second offset received for the respective other segment of the show to the respective referenced audio/video location to identify the boundaries of the respective other segment of the show.

21. The method of claim 19, wherein receiving the autonomous location information, the first offset, and the second offset further comprise:

receiving the autonomous location information, in association with the first offset and the second offset, separately from the first audio/video stream.

22. The method of claim 19, wherein determining whether the second identified audio/video location corresponds with a first boundary of the first segment further comprises:

determining whether the second identified audio/video location comprises a substantially black screen.

23. The method of claim 19, wherein determining whether the second identified audio/video location corresponds with a first boundary of the first segment further comprises:

determining whether the second identified audio/video location is associated with muted audio.

* * * * *